United States Patent
Bao

(10) Patent No.: US 11,287,048 B1
(45) Date of Patent: Mar. 29, 2022

(54) FLOW CONTROL VALVE BY BENDING A PIPELINE

(71) Applicant: Tien-I Bao, New Taipei (TW)

(72) Inventor: Tien-I Bao, New Taipei (TW)

(*) Notice: Subject to any disclaimer, the term of this patent is extended or adjusted under 35 U.S.C. 154(b) by 0 days.

(21) Appl. No.: 17/073,423

(22) Filed: Oct. 19, 2020

(51) Int. Cl.
*F16K 7/02* (2006.01)
*F16K 31/04* (2006.01)

(52) U.S. Cl.
CPC .............. *F16K 7/02* (2013.01); *F16K 31/047* (2013.01)

(58) Field of Classification Search
USPC ........................................................ 251/4–10
See application file for complete search history.

(56) References Cited

U.S. PATENT DOCUMENTS

| | | | | |
|---|---|---|---|---|
| 3,182,602 A | * | 5/1965 | Price .................. | F04B 43/0072 417/53 |
| 3,598,288 A | * | 8/1971 | Posgate ................. | F16K 7/068 222/644 |
| 2018/0245698 A1 | * | 8/2018 | Musolf ..................... | F16K 7/07 |

* cited by examiner

*Primary Examiner* — Daphne M Barry

(57) ABSTRACT

A flow control valve by bending a pipeline comprises: a motor; a driving device having one end connecting to a spindle of the motor; the spindle of the motor serving to drive the driving device; another end of the driving device being connected to a pipeline connection device for retaining a flexible pipeline; wherein when the motor is actuated, the spindle of the motor drives the driving device so that the driving device moving along a fan shape section to drive the pipeline to bend to be formed as a bending section; as a result, the pipeline is bent to form an angle along the bending section; the bending of the pipeline confines flow rates of the fluid within the pipeline, in an extreme state, it is possible that the flow rate is reduced to zero.

9 Claims, 3 Drawing Sheets

US 11,287,048 B1

FLOW CONTROL VALVE BY BENDING A PIPELINE

FIELD OF THE INVENTION

The present invention is related to flow control valves, and in particular to a flow control valve by bending a pipeline.

BACKGROUND OF THE INVENTION

In many prior arts, water transfers are frequently usages in daily life, such as water spraying of flower guards, fish cultivation, home used water, office used water, etc. However, fluid transfer is a very frequent usage in daily life and in industries.

Conveniently, fluid transfer is controlled through fluid valves. In the conventional fluid valves, valve sheets or valve rods are used to control the flow. Generally, the valve sheets or valve rods are rotated so as to control the opening of the valve and thus control the flow in the pipelines. However, these components are made of metals, or other heavy materials, and many components are used so that the power used is great and the cost is high. Furthermore the installations of these valves are performed by professional workers. It cannot be made of general users.

SUMMARY OF THE INVENTION

Accordingly, for improving above mentioned defects in the prior art, the object of the present invention is to provide a flow control valve by bending a pipeline, wherein in the present invention, the motor, the driving device, the pipeline connection device and the pipeline are combined to form a flow control valve, only several components are used and the structure is very easy, the cost is low, and the assembly work is simple and quick. Anybody can install the structure of the present invention. Furthermore the driving device 20 and the fixing device 50 are made of non-metal material so that they are light and the power used is small. The present invention is very suitable for the fluid supplies in spraying flowers, grasses, etc., or cultivation of fishes, etc., or water transfer in home, office, etc.

To achieve above object, a flow control valve by bending a pipeline which comprises: a motor; a driving device having one end connecting to a spindle of the motor; the spindle of the motor serving to drive the driving device; another end of the driving device being connected to a pipeline connection device for retaining a flexible pipeline; wherein when the motor is actuated, the spindle of the motor drives the driving device so that the driving device moving along a fan shape section to drive the pipeline to bend to be formed as a bending section; as a result, the pipeline is bent to form an angle along the bending section; the bending of the pipeline confines flow rates of the fluid within the pipeline, in an extreme state, it is possible that the flow rate is reduced to zero.

DETAILED DESCRIPTION OF THE INVENTION

In order that those skilled in the art can further understand the present invention, a description will be provided in the following in details. However, these descriptions and the appended drawings are only used to cause those skilled in the art to understand the objects, features, and characteristics of the present invention, but not to be used to confine the scope and spirit of the present invention defined in the appended claims.

Figure 1:
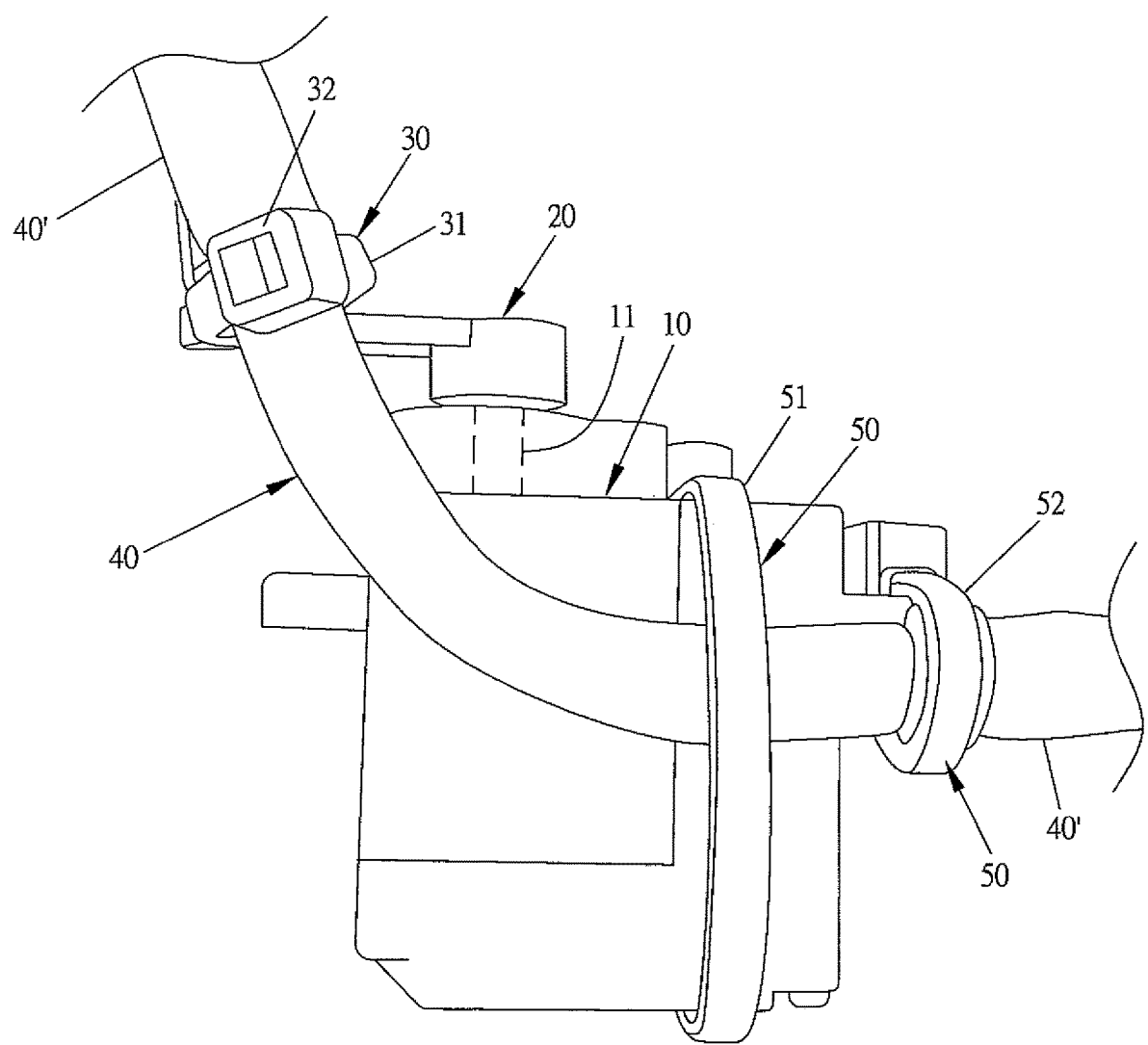
FIG. 1 is a schematic view showing the assembly of the components of the present invention.
Figure 2:
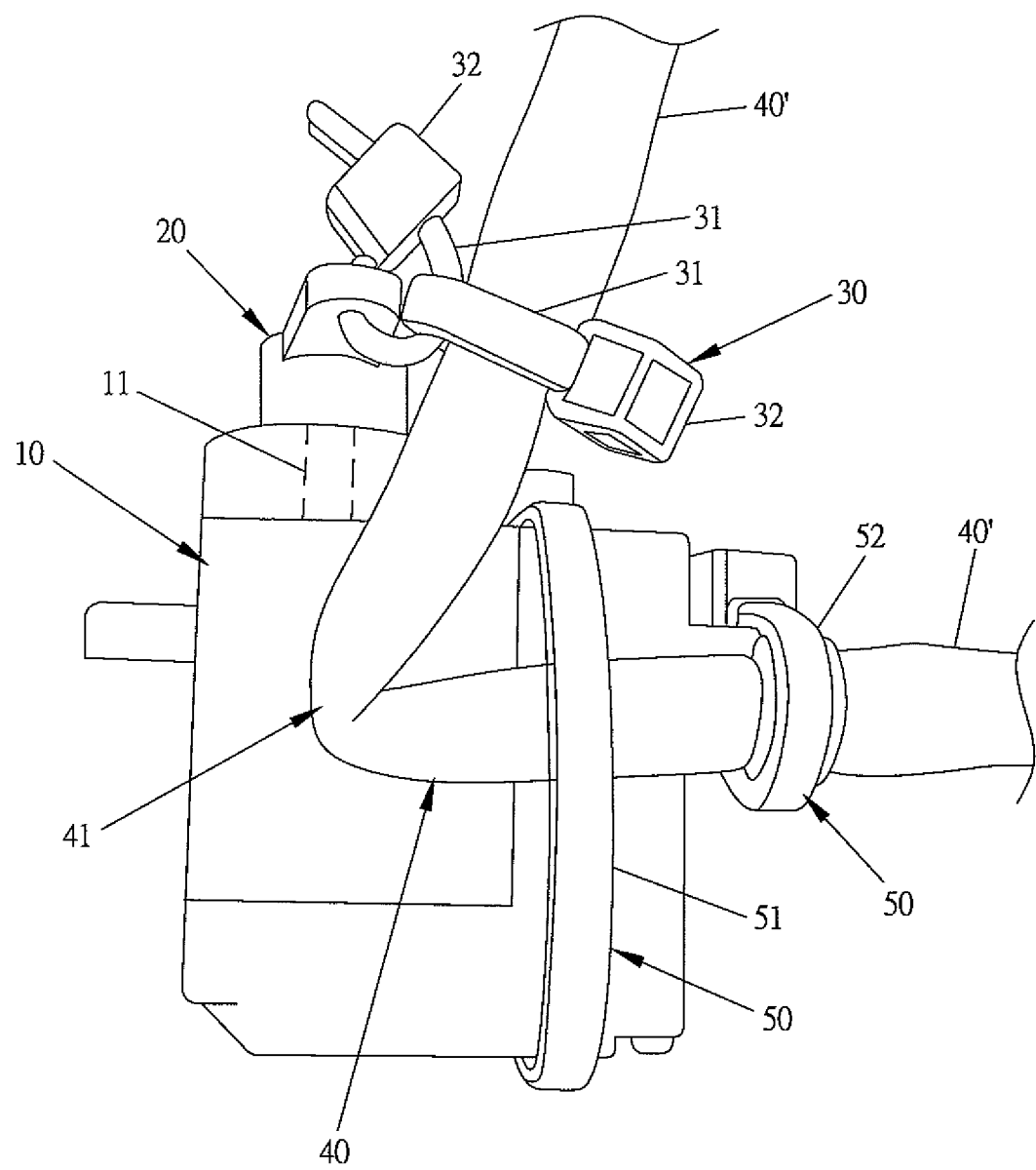
FIG. 2 is another schematic view showing the assembly of the components of the present invention.
Figure 3:
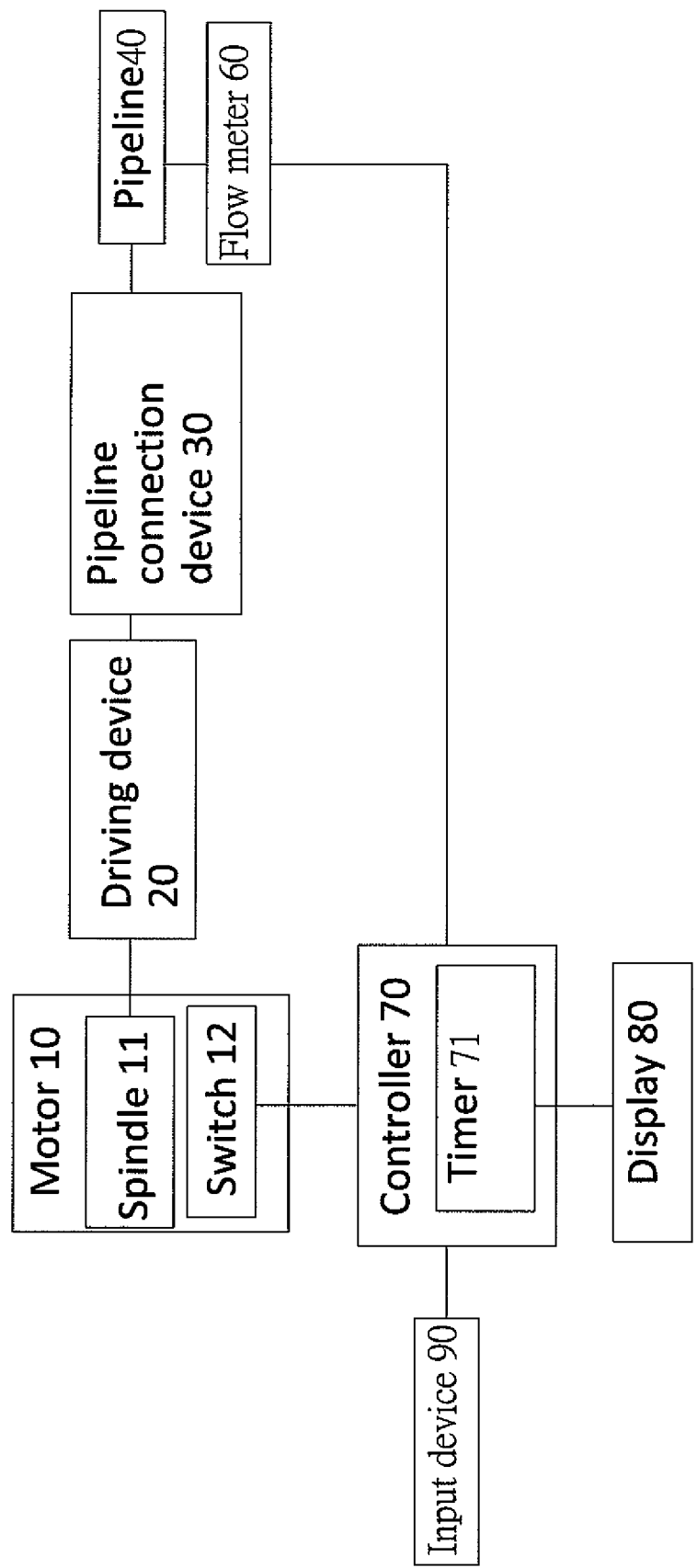
FIG. 3 is a structural block diagram of the present invention.

With reference to FIGS. 1 to 3, the structure of the present invention is illustrated. The present invention includes the following elements.

A motor 10 is included.

A driving device 20 has one end connecting to the spindle 11 of the motor 10. The spindle 11 of the motor 10 will drive the driving device 20. Another end of the driving device 20 is connected to a pipeline connection device 30 for retaining a flexible pipeline 40. The pipeline connection device 30 may be of any form, while this is not confined in the present invention, only that the pipeline connection device 30 can retain the pipeline 40 and drive the pipeline 40 to bend.

FIG. 1 shows one from of the pipeline 40 according to the present invention. In that, the pipeline connection device 30 includes at least one retaining strip 31 for tying the pipeline 40. One end of the retaining strip 31 has a tightening ring 32 and the retaining strip 31 can pass through the tightening ring 32. The retaining strip 31 can enclose the pipeline 40 so as to form as a round structure for retaining the pipeline 40. The pipeline 40 is a flexible pipeline. By adjusting a length of the retaining strip 31 passing through the tightening ring 32, the tightness of the retaining strip 31 to the pipeline 40 is adjustable. In the present invention, there may be a plurality of retaining strips 31 which are connected in series and only one retaining strip 31 at a distal end is connected to the tightening ring 32.

If the original tube passed through by fluid is flexible so that the tube is bendable to a proper extend for adjusting fluid flowing therethrough, this tube can be directly connected with the pipeline connection device 30. If the tube 40' passing the fluid is not so flexible to provide a proper bend for controlling the fluid flowing therethrough, then an extra pipeline 40 is necessary to be connected to the original tube 40'. That is, the original tube 40' is cut to break into two sections, and then the pipeline 40 is connected between the two sections of the tube 40', as shown in FIG. 1.

With reference to FIG. 2, when the motor 10 is actuated, the spindle 11 of the motor 10 will drive the driving device 20 so that the driving device 20 swipes along a fan shape section so as to drive the pipeline 40 to bend to be formed as a bending section 41. As a result, the pipeline 40 is bent to form an angle along the bending section 41. Because the bending of the pipeline 40 will confine the flow rate of the fluid within the pipeline 40, in an extreme state, it is possible that the flow rate is reduced to zero.

In the present invention, to have a better effect, an angle between an area of the fan shape and the pipeline 40 is between 70 to 110 degrees, it is preferable, the angle is 90 degrees.

The present invention further comprises a fixing device 50 for fixing the pipeline 40. In the present invention, the pipeline connection device 30 and the fixing device 50 are installed at two opposite sides of the bending section 41 of the pipeline 40. Therefore, when the driving device 20 drives the pipeline connection device 30 to move, since one end of the driving device 20 is fixed by the fixing device 50, the pipeline connection device 30 can drive the bending section 41 of the pipeline 40 to form as different angles.

In one embodiment of the present invention, the fixing device 50 comprises a first curved body 51. The first curved body 51 is fixed to a periphery structure (such as a wall or a body of the motor 10), the pipeline 40 will tightly resist against the motor 10 so that the pipeline 40 will be fixed to the motor 10.

In one embodiment of the present invention, the fixing device 50 further comprises a second curved body 52 for further fixing the pipeline 40 to the periphery structure.

With reference to FIG. 3, the present invention further comprises the following elements.

A flow meter 70 is installed to the pipeline 40 for detecting the flow in the pipeline 40.

A controller 70 is connected to the flow meter 70 for receiving the flow value from the flow meter 70 and controlling a power switch 12 of the motor 10 so as to control a rotation speed of the motor 10, and thus the bending angle of the bending section 41 of the pipeline 40 is controlled so as to control the flow rate of the fluid in the pipeline 40.

The controller 70 is further connected to a display 80 which serves to display the flow rate of the fluid within the pipeline 40 and the electric current of the motor 10. The controller 70 is connected to an input device 90 for receiving input data which are current values and time period for controlling the motor 10.

The controller 70 further comprises a timer 71 so that a user can set the flow rate of the pipeline 40 in different time period or time so that the flow rate of the pipeline 40 is changeable with the setting time.

The advantages of the present invention will be described herein. In the present invention, the motor 10, the driving device 20, the pipeline connection device 30 and the pipeline 40 are combined to form a flow control valve, only several components are used and the structure is very easy, the cost is low, and the assembly work is simple and quick. Anybody can install the structure of the present invention. Furthermore the driving device 20 and the fixing device 50 are made of non-metal material so that they are light and the power used is small. The present invention is very suitable for the fluid supplies in spraying flowers, grasses, etc., or cultivation of fishes, etc., or water transfer in home, office, etc.

The present invention is thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A flow control valve by bending a flexible pipeline, comprising:
    a motor;
    a driving device having one end connecting to a spindle of the motor; the spindle of the motor serving to drive the driving device; another end of the driving device being connected to a pipeline connection device for retaining the flexible pipeline;
    wherein when the motor is actuated, the spindle of the motor drives the driving device so that the driving device moving along a fan shape section to drive the flexible pipeline to bend to be formed as a bending section; as a result, the flexible pipeline is bent to form an angle along the bending section; the bending of the flexible pipeline confines flow rates of the fluid within the flexible pipeline, in an extreme state, wherein, the flow rate is reduced to zero; and
    a controller connected to the flow meter for receiving flow values from the flow meter and controlling a power switch of the motor so as to control a rotation speed of the motor, and thus the bending the angle of the bending section of the flexible pipeline is controlled so as to control the flow rate of the fluid in the flexible pipeline; and
    wherein the controller is connected to an input device for receiving input data which are current values and time period for controlling the motor.

2. The flow control valve by bending the flexible pipeline as claimed in claim 1, wherein the pipeline connection device includes at least one retaining strip for tying the flexible pipeline; one end of the at least one retaining strip having a tightening ring and the at least one retaining strip can pass through the tightening ring; the at least one retaining strip encloses the flexible pipeline so as to form as a round structure for retaining the flexible pipeline; by adjusting a length of the at least one retaining strip passing through the tightening ring, the tightness of the at least one retaining strip to the flexible pipeline is adjustable.

3. The flow control valve by bending the flexible pipeline as claimed in claim 2, wherein there are a plurality of the at least one retaining strips which are connected in series and only one of the at least one retaining strips at a distal end is connected to the tightening ring.

4. The flow control valve by bending the flexible pipeline as claimed in claim 1, further comprising a fixing device for fixing the flexible pipeline; the pipeline connection device and the fixing device are installed at two opposite sides of the bending section of the flexible pipeline; therefore, when the driving device drives the pipeline connection device to move, since one end of the driving device is fixed by the fixing device, the pipeline connection device can drive the bending section of the flexible pipeline to form the angle.

5. The flow control valve by bending the flexible pipeline as claimed in claim 4, wherein the fixing device comprises a first curved body; the first curved body is fixed to a periphery structure, the flexible pipeline will tightly resist against the motor so that the flexible pipeline is fixed to the motor.

6. The flow control valve by bending the flexible pipeline as claimed in claim 5, wherein the fixing device further comprises a second curved body for further fixing the flexible pipeline to the periphery structure.

7. The flow control valve by bending the flexible pipeline as claimed in claim 1, further comprising a flow meter installed to the flexible pipeline for detecting a flow in the flexible pipeline.

8. The flow control valve by bending e the flexible pipeline as claimed in claim 1, wherein the controller is further connected to a display which serves to display the flow rate of the fluid within the flexible pipeline and electric currents of the motor.

9. The flow control valve by bending the flexible pipeline as claimed in claim 1, wherein the controller further comprises a timer so that a user can set the flow rate of the flexible pipeline in different time period or time so that the flow rate of the flexible pipeline is changeable with the setting time.

* * * * *